US005325306A

United States Patent [19]

Adachi et al.

[11] Patent Number: 5,325,306

[45] Date of Patent: Jun. 28, 1994

[54] SYSTEM FOR INFORMING PAPER SHIFT IN APPARATUS FOR PRODUCING CORRUGATED PAPER BOARDS

[75] Inventors: Nokihisa Adachi; Minoru Naitou; Shinji Watanabe, all of Kasugai, Japan

[73] Assignee: Isowa Industry Co., Ltd., Aichi, Japan

[21] Appl. No.: 721,335

[22] Filed: Jul. 1, 1991

[30] Foreign Application Priority Data

Jul. 6, 1990 [JP] Japan .................................... 2-72010

[51] Int. Cl.[5] ........................ G06F 15/46; B32B 31/00; B65H 19/00

[52] U.S. Cl. .................................... 364/471; 156/367; 242/57

[58] Field of Search .................. 364/469, 471; 156/64, 156/350-353, 361, 366, 367, 368, 378, 470; 242/36, 57

[56] References Cited

U.S. PATENT DOCUMENTS

| | | | |
|---|---|---|---|
| 4,174,237 | 11/1979 | Hemming, Jr. et al. | 156/64 |
| 4,268,341 | 5/1981 | Huhne | 156/207 |
| 4,284,445 | 8/1981 | Shimizu . | |
| 4,576,663 | 3/1986 | Bory . | |
| 4,631,682 | 12/1986 | Ng et al. | 364/471 |
| 5,150,302 | 9/1992 | Adachi et al. | 364/468 |

FOREIGN PATENT DOCUMENTS 993148 5/1965 United Kingdom .

*Primary Examiner*—Long T. Nguyen
*Assistant Examiner*—Thomas E. Brown
*Attorney, Agent, or Firm*—Cushman, Darby & Cushman

[57] ABSTRACT

To determine a paper splice time when the present web is spliced to a next web for the purpose of a so-called lot shift (or a paper shift) in an apparatus for producing corrugated paper boards, not only a length of each core but also a length of each web have been hitherto measured. In view of the current circumstance that a measuring operation is accompanied by various errors and an order is often given with a small lot in size, determination of a paper shift time is made at an operator's discretion which depends on his skill. In practice, there often arises a malfunction that the operator erroneously determines the time when a paper shifting operation is to be performed. To obviate the foregoing malfunction, the present invention provides a system for informing a paper shift during a production controlling operation for an apparatus for producing corrugated paper boards wherein a remaining time till the time when a paper shifting operation is performed can be assured by a time enough long to accomplish the paper shifting operation regardless of a lot size and moreover a warning for informing the time when the paper shifting operation is started as well as a warning at each step during production of corrugated paper boards can be instructed.

14 Claims, 5 Drawing Sheets

SYSTEM FOR INFORMING PAPER SHIFT IN APPARATUS FOR PRODUCING CORRUGATED PAPER BOARDS

BACKGROUND OF THE INVENTION

1. Field of the Invention

The present invention relates to a system for informing a paper shift during a production controlling operation for an apparatus for producing corrugated paper boards.

2. Description of the Related Art

To facilitate understanding of the present invention, a typical conventional apparatus for producing corrugated paper boards will briefly be described below with reference to FIG. 4.

As shown in FIG. 4, the apparatus for producing corrugated paper boards is constructed such that webs 6 and 7 are conveyed from rolls mounted on a mill roll stand to a single facer 11 via splicers 20 and 21, the one web 7 is corrugated in the single facer 11 to form a core and the other web 6 is adhesively secured to the core thereby to produce a sheet of one-sided corrugated paper board 13 in the form of a continuous A flute. The one-sided corrugated paper board sheet 13 is conveyed to a double facer 16 via an overhead bridge 15, a three-staged preheater 26 and a gluing machine 33. In addition, another sheet of one-sided corrugated paper board 14 in the form of a B flute produced via the same steps as those for the one-sided corrugated paper board sheet 13 while having a different corrugation height as well as a web 10 in the form of a front liner paper are conveyed to the double facer 16 from rolls mounted on the mill roll stand via a splicer 24 and another three-staged preheater. The one-sided corrugated paper board sheets 13 and 14 and the front liner paper 10 are adhesively secured to each other in the double facer 16 thereby to produce a sheet of double-sided corrugated paper board 32. The double-sided corrugated paper board 32 is then subjected to slitting and scoring in an assembly 19 of slitter and scorer. Subsequently, it is cut to a predetermined length by actuating a rotary cutter 19.

Further, the apparatus performs a controlling operation for counting the number of sheets produced in the apparatus in the following manner. Specifically, the controlling operation is performed in such a manner as to calculate the position where a preset number of sheets can be produced with the present structure of each web and then execute a so-called lot shift (or a paper shift) at the foregoing position so as to allow to the present web to be spliced to a subsequent web having another structure. The lot shift is achieved in whole combination of the respective cores and webs. In other words, to carry out a lot shift, the present webs are spliced to subsequent webs of the kind corresponding to a next production lot in splicers 20, 21 and 24. With respect to not only a splice point for webs but also a splice point for cores which is directly measured with much difficulties, determination of splice points at which a web and a core are spliced to subsequent web and core has been hitherto accomplished by measuring a running length of each web-and then calculating a value representative of a running length of each core based on values derived from the measurements while the core running length value is added with a calculated take-up rate. As far as a sheet of corrugated paper board is concerned, the calculated take-up rate refers to a ratio of a length of each corrugated core in the extended state to a length of the liner paper, i.e., the web adhering to the core. When the calculated take-up rate is practically added with the value derived from the measurement of the running length of the web, the standard value which has been definitely predetermined corresponding to a height of the corrugated core is normally used.

Determination of splice points in the above-described manner is accompanied by many factors which may cause errors. One of such errors is caused when the liner paper and a final product of corrugated paper board are measured and a running length of the corrugated core is then determined based on the value derived from the measurement of the liner paper and the final product of corrugated paper board. Another error is caused when measurements are carried out with the aid of a rotary pulse signal generator and a slippage measuring instrument for measuring slippage between webs or sheets. Another error is caused when the liner paper and the final product of corrugated paper board expand or contract due to variation of a moisture content and a kind of paper to be measured. In addition, an error is caused when the final product of corrugated paper board is cut by actuating the rotary cutter 19. Finally, a sum of these errors appears in the form of an incorrect length as a result of superposition of the errors as mentioned above.

In recent years, many requests for a smaller lot in size (reduced number of corrugated paper boards) and reduction of a reject rate have been raised from users. The smaller the number of corrugated paper boards to be produced per one lot, the longer the erroneous part in a length of the final product of corrugated paper board. This causes the rate of rejection to be increased undesirably. In view of the aforementioned errors, the inventor has made proposals to reduce generation of errors as disclosed in two prior inventions, one of them being filed under Japanese Patent Application No. 114795/1989 with a title "A method of measuring a running sheet length in an apparatus for producing corrugated paper boards" and the other one being filed under Japanese Utility Model Application No. 61211/1989 with a title "An apparatus for controlling production and measurement in an apparatus for producing corrugated paper boards". The former prior invention is intended to prevent generation of measurement errors due to expansion and contraction of each web and obtain a measured value with higher accuracy on the running length measuring instrument side by properly correcting the measured value derived from the rotary pulse signal generator at a production speed of each web passing between mark sensors disposed with a predetermined distance therebetween. The latter prior invention is intended to prevent generation of errors due to expansion and contraction of each web by measuring a running length of each of webs for a liner paper and a corrugated core, calculating a splice point for each of the webs to be spliced to each other based on a value derived from the measurement and then adding the value derived from the measurement of a running length of each web with a calculated take-up rate in a case where a value derived from measurement of liner paper including an error value unchangeably is used in place of a running length of the corrugated core.

Since the controlling operation for the apparatus for producing corrugated paper boards is performed based on a production length of each final product of corrugated paper board, and moreover a constant value controlling process utilizing a manual speed command or a standard speed command depending on conditions such as a kind of paper or the like is employed for the purpose of determining a production speed, there does not arise any particular problem in a case where a lot size is large in length and a production length of each final product of corrugated paper board is longer than a line stay length between the rotary cutter 19 and the splicers 20, 21 and 24. In recent years, however, since many requests for a smaller lot size have been raised from users, there may arise an occasion that a paper shifting operation to be performed in response to an order change for webs to be subsequently spliced cannot follow the present production speed. In other words, a paper shifting operation has been hitherto manually performed by an operator under a condition that a time required for performing a splicing operation is recognized as a standard time. In addition, an operational setting time having the standard time added with some allowance time is assured so as not to cause a malfunction during a normal operation of the apparatus. However, in a case where an order is given with a small lot in length shorter than the operational setting time, there may arise a trouble when a paper shifting operation is performed. In addition, since the time when an operator performs a paper shifting operation is determined at his own discretion depending on a quantity (length) of unfeeling of a web from the mill roll stand, other problems are that a highly trained skill is required for accomplishing the paper shifting operation and the operator erroneously determines the time when the paper shifting operation is properly performed.

SUMMARY OF THE INVENTION

The present invention has been made with the foregoing background in mind.

An object of the present invention is to provide a system for informing a paper shift during a production controlling operation for an apparatus for producing corrugated paper boards wherein a remaining time untill the time when a paper shift is carried out can be assured for a period of a time required for achieving the paper shift.

Another object of the present invention is to provide a system for informing paper shift during a production controlling operation for an apparatus for producing corrugated paper boards wherein not only indication of a time when the production controlling operation is started, but also indication of a warning at each step in the course of the production controlling operation for the apparatus can be achieved.

To accomplish the above objects, the present invention provides a system for informing a paper shift during a production controlling operation for an apparatus for producing corrugated paper boards wherein a remaining production length is calculated at a cutter portion based on a running length of a final product of of corrugated paper board and a previously estimated production length, and a line stay length between the cutter portion and each splicer is then subtracted from the remaining production length thereby to calculate another remaining production length from the splicer to each splice point, wherein a paper shift remaining time calculating unit calculates a remaining time untill the paper shift based on the remaining production length from the splicer to the splice point as well as a running speed of each web and an unit for determining a prior time before a paper shifting operation is to be performed outputs an informing signal so as to seize the present operational progressive state on preparation for the paper shifting operation at a step of performing the paper shifting operation when an informing time preset in the lastmentioned unit as well as a remaining time till the splice point which has been calculated by the paper shift remaining time calculating unit are reached. In addition, with the system of the present invention, a deceleration commanding unit receives the the paper shift remaining time which has been calculated by the paper shift remaining time calculating unit to output a deceleration signal for decelerating a production speed when it is found from the result derived from a comparison between the preset standard operation time required for performing the paper shifting operation and the paper shift remaining time which has been calculated by the paper shift remaining time calculating unit that the present paper shift remaining time is shorter than the standard operation time.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

Figure 1:
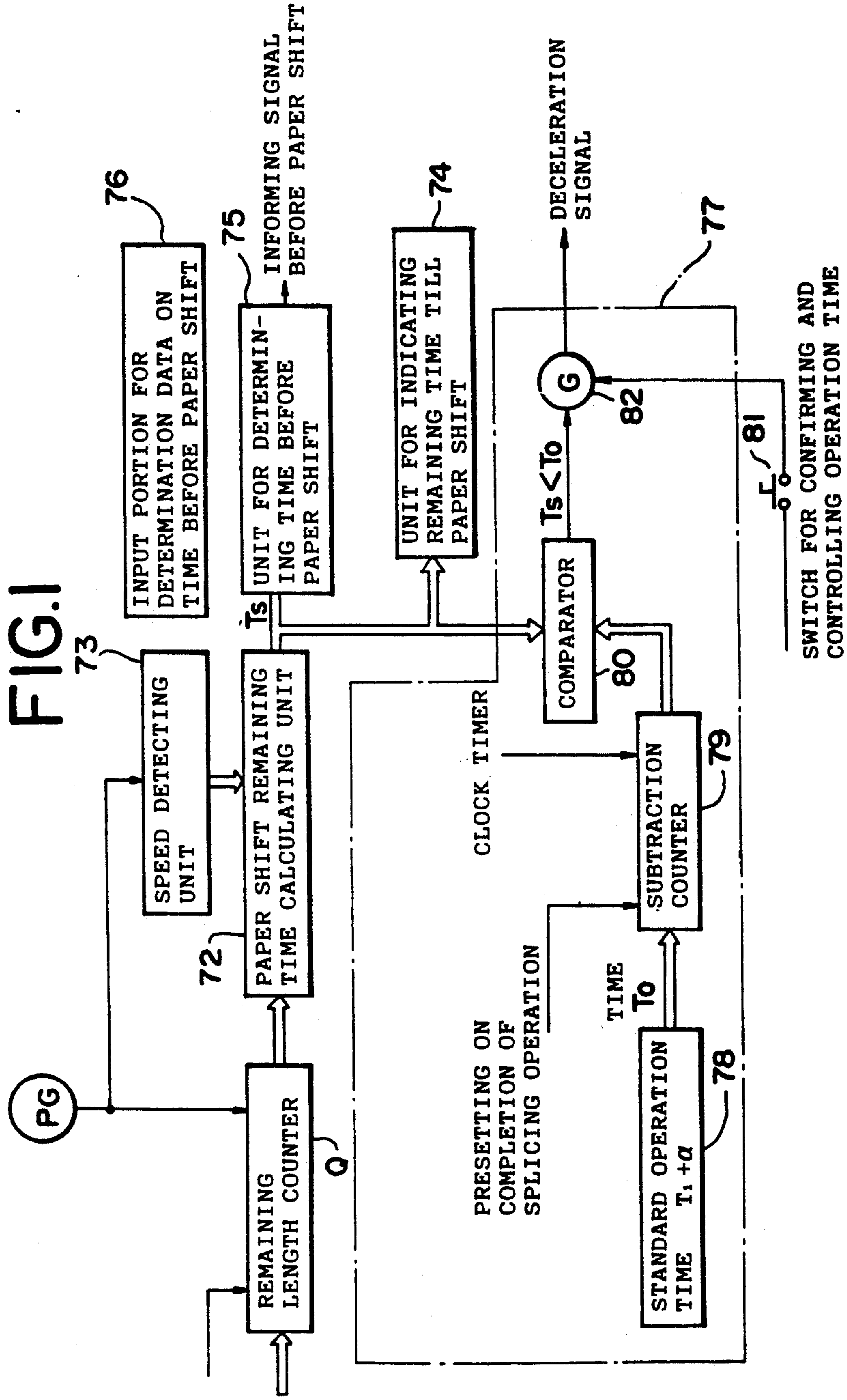
FIG. 1 is a block diagram which schematically illustrates the structure of a system for informing a paper shift during a production controlling operation for an apparatus for producing corrugated paper boards in accordance with an embodiment of the present invention.

Now, the present invention will be described in detail hereinafter with reference to the accompanying drawings which illustrate a preferred embodiment of the present invention.

In fact, the present invention has been made based on an inventor's prior invention which was filed under Japanese Utility Model Application No. 61211/1989 with a title "An apparatus for controlling production and measurement in an apparatus for producing corrugated paper boards". Prior to description of the present invention, the apparatus for controlling production and measurement in an apparatus for producing corrugated paper boards in accordance with the inventor's prior invention will be described below with reference to FIG. 4 and FIG. 5. As shown in the drawings, the apparatus is equipped with rotary pulse signal generators ALPG, AMPG, BLPG, BMPG and LPG for measuring a running length of each of webs 6, 7 and 10 for an one-sided corrugated paper board sheet 13 for an A flute having a certain corrugation height, an one-sided corrugated paper board sheet 14 for a B flute having a different corrugation height from that of the A flute and a front liner paper 10. It should be noted that these rotary pulse signal generators ALPG, AMPG, BLPG, BMPG and LPG are arranged on the inlet side of each of splicers 20, 21 and 24. In addition, the apparatus is equipped with rotary pulse signal generators APG and BPG for measuring a running length of each of the webs 6 for the one-sided corrugated paper board sheet 13 for the A flute and the one-sided corrugated paper board sheet 14 for the B flute on the outlet side of a preheater 25. To detect marks on the one-sided corrugated paper board sheets 13 and 14, inlet side mark sensors 27 and 29 and outlet side mark sensors 28 and 30 are arranged on the outlet side of a single facer 11 and the inlet side of an overhead bridge 15 for producing the one-sided corrugated paper board sheet 13 for the A flute and the one-sided corrugated paper board 14 for the B flute as well as on the outlet side of a three-staged preheater 26. The marks on the one-sided corrugated paper boards 13 and 14 are simultaneously adhesively secured to them using sheets of silver-colored paper pieces when subsequent webs are spliced to the present webs 6 on the liner side ( i.e., when a paper shifting operation is performed ). Alternatively, an operator may adhesively place marks on the webs 6 at an adequate time. Additionally, to detect marks for indicating a lot change as well as the present production length of a twin double-sided corrugated paper board (or a double-sided corrugated paper board) 32, a mark sensor 31 and a rotary pulse signal generator CPG are arranged at the position upstream of a rotary cutter 19. Specifically, the mark sensor 31 is intended to detect a distance untill the foremost end of a cutter blade of the rotary cutter 19 to output a signal indicative of the lot change when the aforementioned marks are detected. On the other hand, the pulse generator CPG is adapted to generate a signal which is utilized as a control signal not only for activating an AF bridge stay length measuring block 35 and a BF bridge stay length measuring block 38 in a production control section to be described later but also for cutting the double-sided corrugated paper board 32 to a predetermined length by actuating the rotary cutter 19.

Figure 5:
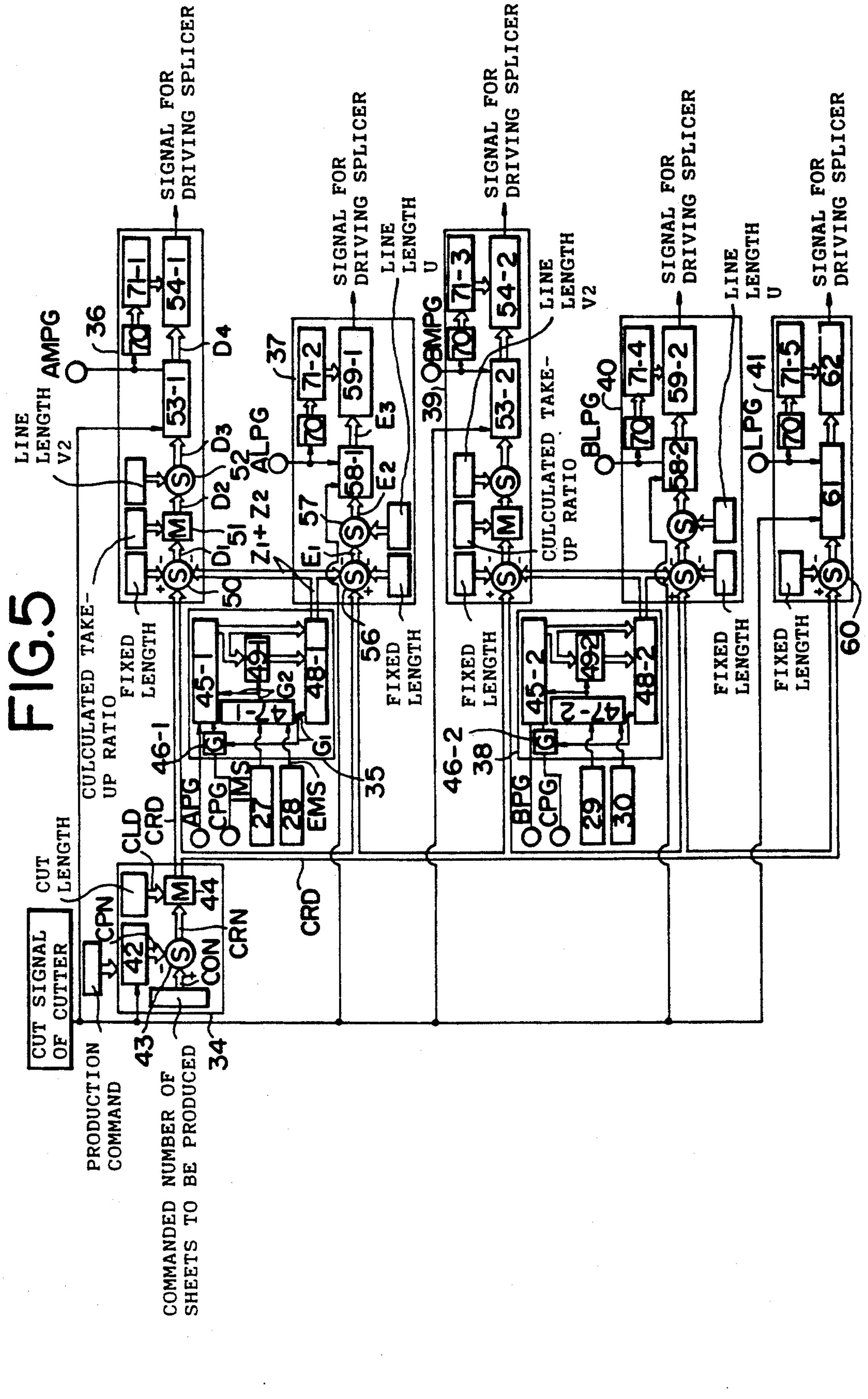
FIG. 5 is a block diagram which-illustrates the structure of a production control section employable for carrying out the present invention.

As shown in FIG. 5, the production control section includes a cutter position remaining length block 34, an AF bridge stay time measuring block 35 (for the A flute), an AF core splice determining block 36, an AF liner splice determining block 37, a BF bridge stay length measuring block 38 (for the B flute), a BF core splice determining block 39, a BF liner splice determining block 40 and a DF liner splice determining block 41.

In detail, the cutter position remaining length block 34 receives information on the preset number of sheets to be produced per each lot for sheets of corrugated paper boards to be produced and a cut length CL of each sheet of corrugated paper board to be produced and then calculates the number CPN of sheets to be produced with the aid of a counter 42 at the time when it receives a cutter count signal CCS from the rotary cutter 19. Subsequently, the cutter position remaining length block 34 calculates the remaining number CRN of sheets to be cut by the rotary cutter 19 by subtracting the number CPN of sheets to be produced from the present number CON of sheets to be produced with the aid of a subtractor 43. Cutter remaining length data CRD are calculated by adding the remaining number CRN of sheets to be cut with the cut length CL. The cutter remaining length data CRD are fed to the AF core splice determining block 36, the AF liner splice determining block 37, the BF core splice determining block 38, the BF liner splice determining block 40 and the DF liner splice determining block 41, respectively.

Since the BF bridge stay length measuring block 38, the BF core splice determining block 39 and the BF liner splice determining block 40 each serving to perform calculating operations for the one-sided corrugated paper board 14 for the B flute are operated for calculations in the same manner as those for performing calculating operations for the one-sided corrugated paper board 13 for the A flute, description will be made below only as to the one-sided corrugated paper board 13 for the A flute for the purpose of simplification. The AF bridge stay length measuring block 35 is constructed such that a row of pulses outputted from the rotary pulse signal generator APG corresponding to a running speed of the web (liner paper) 6 is inputted into a reversible counter 45 for performing an additive calculation and a row of pulses outputted from the rotary pulse signal generator CPG corresponding to a running speed of the double-sided corrugated paper board sheet 32 is inputted into a reversible counter 45-1 via a gate circuit 46 for performing a subtractive calculation. With this construction, while a row of pulses outputted from the rotary pulse signal generator APG and a row of pulses outputted from the rotary pulse signal generator CPG are inputted into the reversible counters 45 and 45-1, the reversible counter 45-1 calculates a stay length $Z_1$ which normally fluctuates as a running speed of the web 6 differs from a running speed of the double-sided corrugated paper board 32 so that the measured stay length $Z_1$ is added with a stay length $Z_2$ derived from a calculation the mark sensor 27 and a calculation at the mark sensor 28. In other words, when the mark sensor 27 detects the marks on the one-sided corrugated paper board 13 for the A flute, a detection signal is inputted into a gate control circuit 47-1 from the mark sensor 27 so that a control pulse signal $G_1$ is fed to a gate circuit 46-1 and a data shifting circuit 48-1 from a gate control circuit 47 and a control pulse signal $G_2$ is fed to a register 49-1 and the reversible counter 45-1. In response to the control pulse signal $G_1$, the gate circuit 46 closes its gate to interrupt feeding of a row of pulses to the reversible counter 45-1 from the rotary pulse signal generator CPG. This causes the reversible counter 45-1 to receive only a row of pulses outputted from the rotary pulse signal generator APG thereby to start measuring operation for measuring a running length of the one-sided corrugated paper board 13. On the other hand, in response to the control pulse signal $G_2$, the reversible counter 45-1 receives a front edge of the control pulse signal $G_2$ and then transfers to a register 49 data on the stay length directly before a new measuring operation is performed, whereby the register 49 receives a rear edge of the control pulse signal $G_2$ to reset the content of the data on the foregoing stay length.

In response to the control pulse signal $G_1$, the data shifting circuit 48-1 performs a shifting operation for shifting the data on the staying length fed from the reversible counter 45-1 to the data transferred to the register 49-1 and then outputs the data transferred to the register 49-1 to the AF core splice determining block 36 and the AF liner splice determining block 37. In other words, when the mark sensor 27 detects the marks on the one-sided corrugated paper board 13, the reversible counter 45-1 starts a new measuring operation for measuring the stay length $Z_2$. During this measuring operation, the reversible counter 45-1 transfers to the register 49-1 data $X=Z_1+Z_2$ on the stay length directly before the measuring operation so that the data $X=Z_1+Z_2$ are temporarily utilized as fixed data.

The reversible counter 45-1 permits a row of pulses from the rotary pulse signal generator APG to be inputted thereinto until the mark sensor 28 detects the marks on the one-sided corrugated paper board 13, whereby the stay length $Z_2$ corresponding to the length between the mark sensor 27 and the mark sensor 28 is measured by the reversible counter 45-1. When the mark sensor 28 detects the marks on the one-sided corrugated paper board 13, a measuring operation for the stay length $Z_2$ is completed and the data on the stay length $Z_2$ are then memorized in the reversible counter 45-1. Subsequently, when the mark sensor 28 detects the marks on the one-sided corrugated paper board 13, the gate circuit 46-1 is opened again so as to permit a row of pulses from the rotary pulse signal generator CPG to be inputted into the reversible counter 45-1. Then, the reversible counter 45-1 performs a subtractive calculation for subtracting a row of pulses from the rotary pulse signal generator APG from a row of pulses from the rotary pulse signal generator CPG so as to measure the stay length $Z_1$ serving as a factor inducing fluctuation attributable to a difference between the running speed of the one-sided corrugated paper board 13 and the running speed of the double-sided paper board 32 and then to obtain the data $X=Z_1+Z_2$ by performing an additive calculation for adding to the stay length $Z_1$ the stay length $Z_2$ which has been reserved in the reversible counter 45-1 by performing another new measuring operation.

Next, a data controlling circuit 48 activates the data shifting circuit 48-1 when the mark sensor 28 detects the marks on the one-sided corrugated paper board 13, whereby the data $X=Z_1+Z_2$ reserved in the reversible counter 45-1 by performing the foregoing new measuring operation are outputted from the reversible counter 45-1. At this time, the register 49-1 erases the last data which have been reserved in the reversible counter 45-1 but takes therein in a sampling manner the data $X=Z_1+Z_2$ which are continuously outputted from the reversible counter 45-1 at all times. It should be noted that it is convenient for an operator that the content of the data memorized in the register 49-1 can be utilized as desired, in a case where there arises an occasion that the data $X=Z_1+Z_2$are not outputted from the reversible counter 45-1 via the data shifting circuit 48-1 for some reason. To this end, the system of the present invention is equipped with a circuit (not shown) exclusively employable for the aforementioned utilization.

Figure 4:
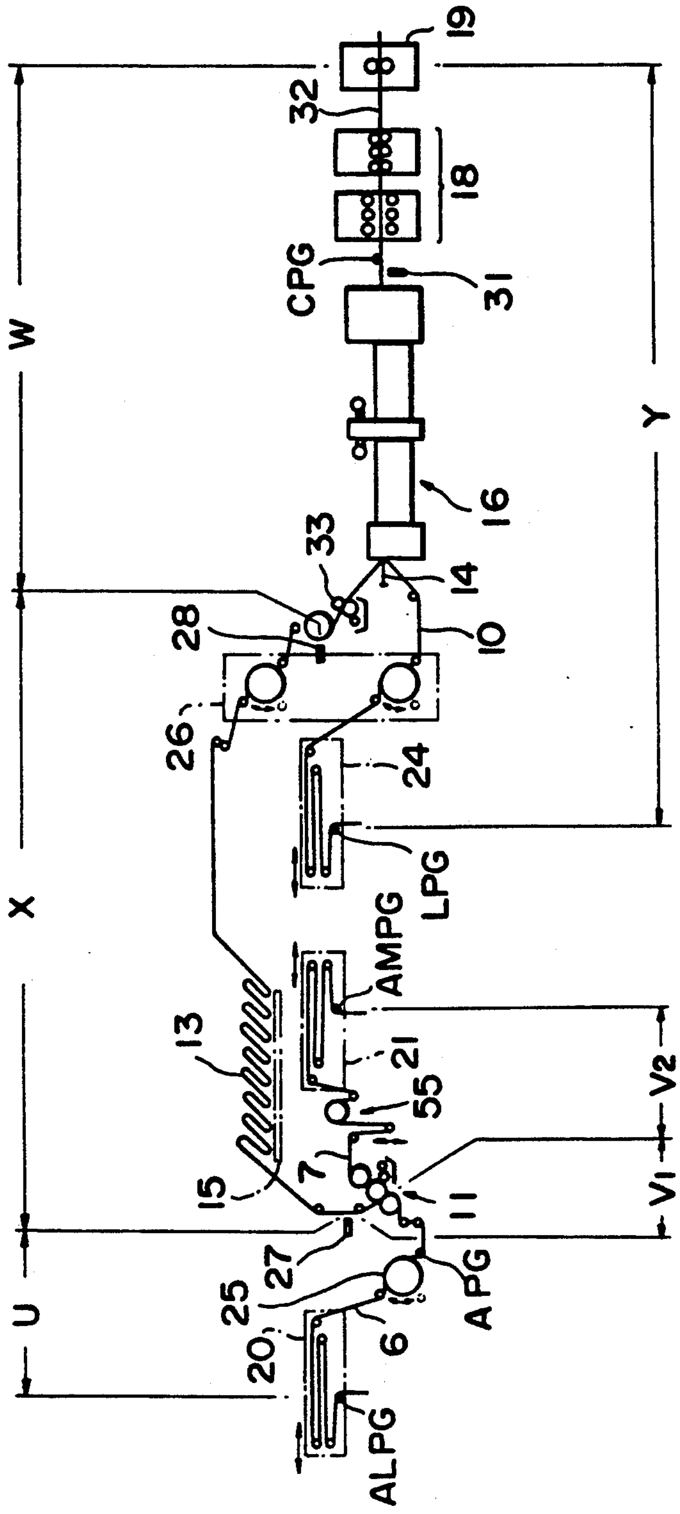
FIG.4 (PRIOR ART)
FIG. 4 is a side view which schematically illustrates a typical conventional apparatus for producing corrugated paper boards.

The data $X=Z_1+Z_2$ outputted from the data-shifting circuit 48-1 are obtained in the form of a sum of the stay length which varies on the overhead bridge 15 and the stay length which varies as a winding angle 8 varies to adjust a quantity of heating depending on the operative conditions of the three-staged preheater 26. In practice, the data $X=Z_1+Z_2$ are fed to the AF core splice determining block 36 and the AF liner splice determining block 37 at the next stage. The AF core splice determining block 36 performs a subtractive calculation for subtracting from the cutter remaining length data CRD outputted from the cutter position remaining length block 34 the data $X=Z_1+Z_2$ outputted from the data shifting circuit 48-1 as well as a line length $V_1+W$ which is naturally determined as shown in FIG. 4. The line length $V_1+W$ is a kind of data in the form of a fixed length which is previously definitely determined because the stay length between the foremost end of a cutter blade of the rotary cutter 19 and the outlet of the single facer 11 does not vary.

After a calculated value $D_1$ outputted from a subtractor 50 is multiplied with a calculated take-up rate in a multipicator 51, it is inputted into a subtractor 52 at which a line length $V_2$ between the inlet of the splicer 21 and the outlet of the single facer 11 is subtracted from the calculated value $D_1$. The line length $V_2$ is composed of a stay length v having no variation factor, a stay length variation value $\Delta\delta$MA determined based on the detection value derived from a sensor (not shown) for detecting the position where a dancer roll in the splicer 21 moves and a stay length $\Delta$tA which varies so as to adjust a quantity of heating of a preconditioner 55 as well as a quantity of moistening. As is well known, the preconditioner 55 is additionally provided with a mechanism for freely adjusting a quantity of moistening in addition to heating means having the same structure as that of the preheater 25. A calculated value $D_3$ outputted from the subtractor 52 is preset at every time when a core remaining length counter 53 receives a cutter cut signal from the rotary cutter 19. Therefore, a new calculated value $D_3$ is inputted into the core remaining length counter 53 at every time when the rotary cutter 19 performs a cutting operation. The core remaining length counter 53 performs a subtractive calculation for the calculated value $D_3$ with the aid of the rotary pulse signal generator AMPG which is arranged on the input side of the splicer 21 (a location where the present web is spliced to a subsequent web ). In other words, data $D_4$ outputted from the core remaining length counter 53 are data derived from another new subtractive calculation performed at every time in response to the cutter cut signal and represent the length as measured from the input side of the splicer 21 to the position where the present web 7 is to be spliced to a subsequent web for a lot change. The data $D_4$ which have been outputted from the core remaining length counter 53 are inputted into a splice time determining circuit 54. The splice time determining circuit 54 is constructed such that the value calculated as a running length corresponding to a dynamic feeding property memorized in a determination data portion 71 in association with the splicing operation is received as a signal from a speed range determining portion 71 to selectively output the foregoing calculated value. In practice, the splice time determining circuit 54 subtracts from the data $D_4$ the data value derived from the foregoing selective outputting, whereby a splicer activating signal is outputted to the splicer 21 at an earlier time in association with the splicing operation corresponding to the dynamic feeding property.

On the other hand, the AF liner splice determining block 37 performs the entirely same calculating operation as that of the AF core splice determining block 36 with the exception that a multiplicative calculation is conducted with a calculated take-up rate. In other words, after the AF liner splice determining block 37 subtracts from the data CRD derived from the cutter position remaining length block 34 the stay length data $X=Z_1+Z_2$ derived from the AF bridge stay length measuring block 35 as well as a line length W shown in FIG. 4 with the aid of a subtractor 56, it subtracts from the subtracted value $E_1$ derived from the foregoing subtraction a line length U shown in FIG. 4. Then, the stay length A SA which varies as the winding angle in the preheater 25 varies is subtracted from the line length U in addition to the stay length u having no variation factor as well as the stay length ΔδLA accompanied by variation of the position where the dancer roll moves in the splicer 20. The line length W represents a fixed stay length which does not vary in the region extending from the outlet side of the three-staged preheater 26 to the foremost end of a cutter blade of the rotary cutter 19. The calculated value data $E_2$ derived from the subtractor 57 are inputted into a liner remaining length counter 58 and then processed in the same manner as the core remaining length counter 53 to calculate the remaining length as measured from the inlet side of the splicer 20. Thereafter, the data $E_3$ derived from the foregoing calculation are inputted into a splice time determining block 59 and then processed in the same manner as the splice time determining circuit 54 thereby to output a splicer activating signal from the splice time determining block 59.

The BF bridge stay length measuring block 38, the BF core splice determining block 39 and the BF liner determining block 40 perform a processing operation in the entirely same manner as the one-sided corrugated paper board sheet 13 for the A flute, respectively.

With respect to the DF liner splice determining block 41, since no stay occurs on the overhead bridge 15, a quantity of variation of any stay length on the overhead bridge 15 is not taken into calculation at all. However, a processing operation of the DF liner splice determining block 41 is same to that of the AF liner splice determining block 37 with the exception that the line length Y corrected based on the stay length ΔθD which varies corresponding to variation of the winding angle θ in the three-staged preheater 26 is used in addition to the stay length ΔδLD which varies as the position where the dancing roll moves in the splicer 24. In other words, after the line length Y is subtracted from the data CRD derived from the cutter position remaining length block 34, the resultant data are inputted into a splice time determining circuit 62 via a liner remaining length counter 61 and then the DF liner splice determining block 41 performs the same processing operation as that of the AF liner splice determining block 37 thereby to output a splicer activating signal from the DF liner splice determining block 41.

With the system of the present invention, a paper shift time is individually informed with respect to the respective webs by utilizing the data outputted from the core remaining length counter 53 and the liner remaining length counters 58 and 61 arranged in the AF core splice determining block 36, the AF liner splice determining block 37, the BF core splice determining block 39, the BF liner splice determining block 40 and the DF liner splice determining block 41 as shown in FIG. 5, and moreover a same systematic structure is employed for each web. In view of the foregoing fact, the core remaining length counter 53 and the liner remaining length counters 58 and 61 will be described below on the assumption that they are hereinafter referred to simply as a remaining length counter Q.

Specifically, as shown in FIG. 1, the remaining length counter Q is electrically connected to a paper shift remaining time calculating unit 72 which receives data from a speed detecting unit 73 to calculate a remaining time $T_S$ till a paper shift (i.e., a splice point) based on the data from the speed detecting unit 73 in addition to the data from the remaining length counter Q. The speed detecting unit 73 receives data from the respective rotary pulse signal generators ALPG, AMPG, BLPG, BMPG and LPG (each of which is hereinafter referred to as a rotary pulse signal generator PG for measuring a running sheet length) to detect a running speed of each web based on the received data. The data outputted from the paper shift remaining time calculating unit 72 are fed not only to a paper shift remaining time indicating unit 74 but also to a unit 75 for determining a prior time before a paper shift. This unit 75 compares one kind or plural kinds of prior times preset in a data input section 76 for determining a prior time before a paper shift with the data outputted from the paper shift remaining time calculating unit 7.2 so as to output an informing signal which informs that the prior present time is a predetermined prior time before a paper shift point (i.e., a splice point) when it is found that the foregoing kinds of prior times coincide with the data outputted from the paper shift remaining time calculating unit 72. The informing signal generates a warning sound whose tone varies depending on each preset time. Alternatively, the informing signal may turn on a warning lamp whose light color varies depending on each preset time. It should be added that the data outputted from the paper shift remaining time calculating unit 72 are fed also to a deceleration commanding unit 77. As shown in FIG. 1, the deceleration commanding unit 77 includes an input unit 78, a subtraction counter 79 and a comparator 80. In detail, the input unit 78 serves to preset a standard time required for a paper shifting operation, i.e., a standard operation time $T_1$ which is required to elapse until the present web now on production is cut to a predetermined length, the rearmost end of the cut web is adhesively spliced to the foremost end of a web to be subsequently produced, i.e., a next web, the cut web is transferred from the mill roll stand and a web subsequent to the next web is then delivered to the mill roll stand so that its foremost end is located in alignment with a splicer so as to enable the web to be spliced to the next web for production to be performed subsequent to next production. Next, the subtraction counter 79 serves to perform a subtractive calculation in response to a timer clock pulse when a switch 81 for confirming and controlling an operation time is shifted to ON by an operator as actuation of the splicer is started or a paper shifting operation is started under an operative condition that a sum of the standard time $T_1$ and an allowance time $\alpha$, i.e., an operation setting time $T_0$ is preset at every time when a preceding splicing operation is completed. Next, the comparator 80 compares the data derived from the subtraction counter 79 with the data delivered from the paper shift remaining time calculating unit 72. When it is required that the production speed is decelerated, the switch 81 is shifted to ON by the operator so that the comparator 80 outputs a deceleration signal via a gate circuit 82 adapted to be opened in operative association with the switch 81. Alternatively, the comparator 80 may directly output a deceleration signal without any necessity for passing through the gate circuit 82. In this case, it is possible to individually output a deceleration signal when the switch 81 is shifted to ON by the operator as desired.

Figure 3:
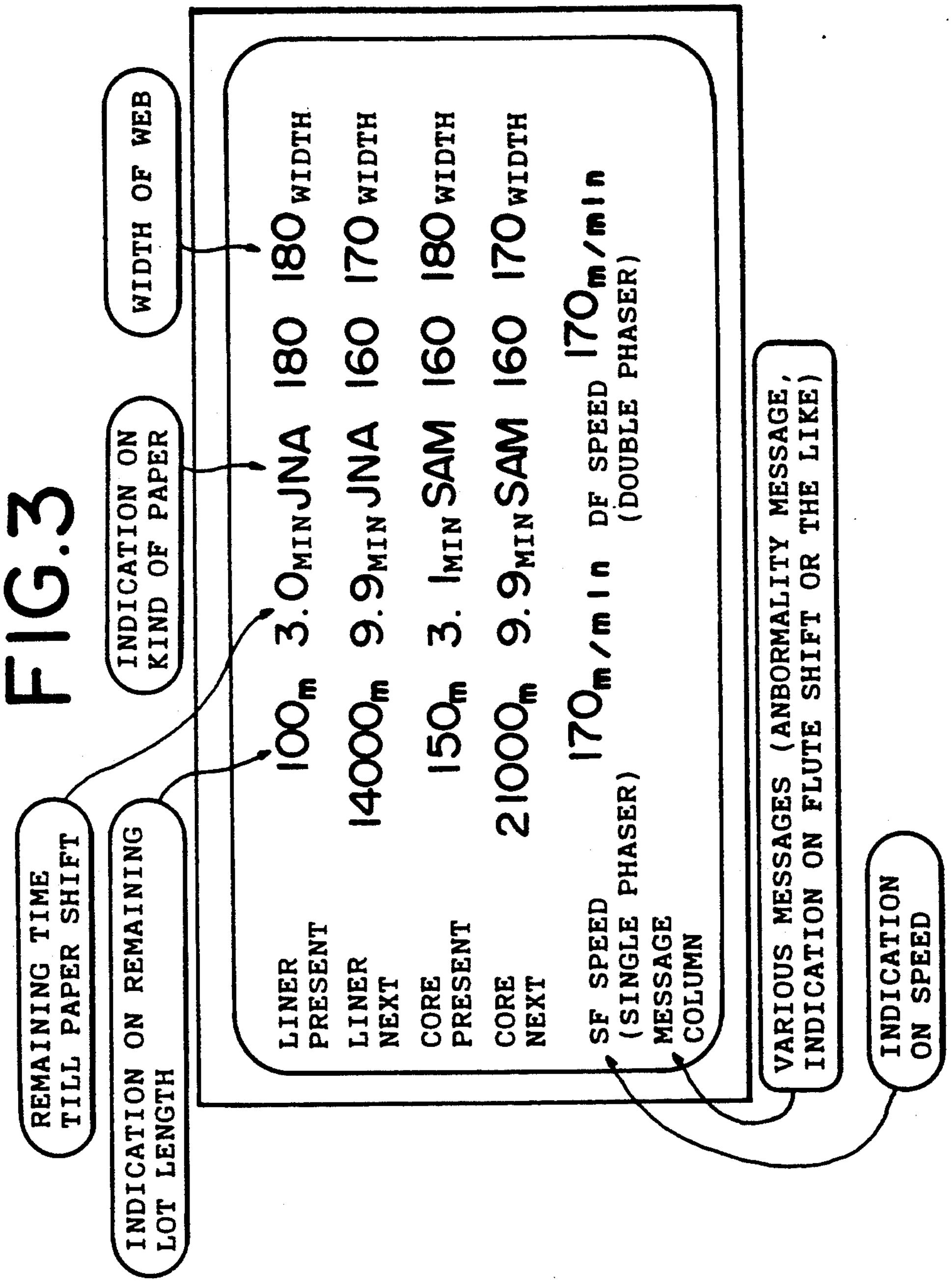
FIG. 3 is a diagram which illustrates a manner of displaying with a paper shift remaining time indicating unit for indicating a remaining time before a paper shifting operation is performed.

In addition, the paper shift remaining calculating unit 72 calculates a remaining time $T_S$ untill a paper shift (i.e., until a paper shifting operation is completed) by dividing a remaining length of the web meters as measured from the splicer to a paper shift time (i.e., a splice point)

with a running speed of the web in m/min. It should be added that the remaining length of the web in meters is outputted from the remaining length counter Q and the running speed of the web is outputted from the speed detecting unit 73 The paper shift remaining time $T_s$ calculated by the paper shift remaining time calculating unit 72 is indicated by the indicating unit 74 as shown in FIG. 3. As is apparent from FIG. 3, the indicating unit 74 indicates not only the paper shift remaining time $T_s$ for the webs employable for the present liner paper and core but also the paper shift remaining time $T_s$ for respective webs employable for a next production lot. With respect to the webs employable for a next production lot, data are processed through the same passages as those shown in FIG. 1 and FIG. 5 with the aid of other channels different from the present channels. However, in view of the fact that production is not still carried out after completion of the shifting operation, these data are indicated after the paper shift remaining time is calculated based on the predetermined standard running speed of each web. In this case, it is possible to indicate the data after the paper shift remaining time $T_s$ is calculated based on the standard running speed of each web and the previously estimated production length with the aid of another calculating unit not shown.

As shown in FIG. 3, the indicating unit 74 simultaneously indicates not only running sheet speeds in the single facer and the double facer but also other informations such as kind of paper usable as a web on a same image screen so as to conveniently provide for operations to be performed by an operator. The data outputted from the calculating unit 72 are fed to the determining unit 75 so as to compare the foregoing data with the data preset in the input portion 76. The input portion 76 sets a first warning time and a second warning time wherein the first warning time is set prior to the second warning time by a time equal to the operation setting time $T_0$ having the standard time $T_1$ added with the allowance time $\alpha$ and the second warning time is utilized for seizing the operational progressive state in the course of the paper shifting operation performed for a period of prior time shorter than the first warning time. Additionally, another time prior to the operation setting time $T_0$can be set adequately.

When it is found from the result derived from a comparison between the paper shift remaining time $T_s$ and the first and second warning times that the paper shift remaining time $T_s$ coincides with either of the first warning time and the second warning time, the determining unit 75 generates an alarm sound of which tone corresponds to the first warning time or the second warning time. Otherwise, the determining unit 75 turns on alarm lamps each of which light color is different from each other. On the other hand, the data derived from the calculating unit 72 are fed to the comparator 80 so as to compare the foregoing data with the data outputted from the subtraction counter 79.

Figure 2:
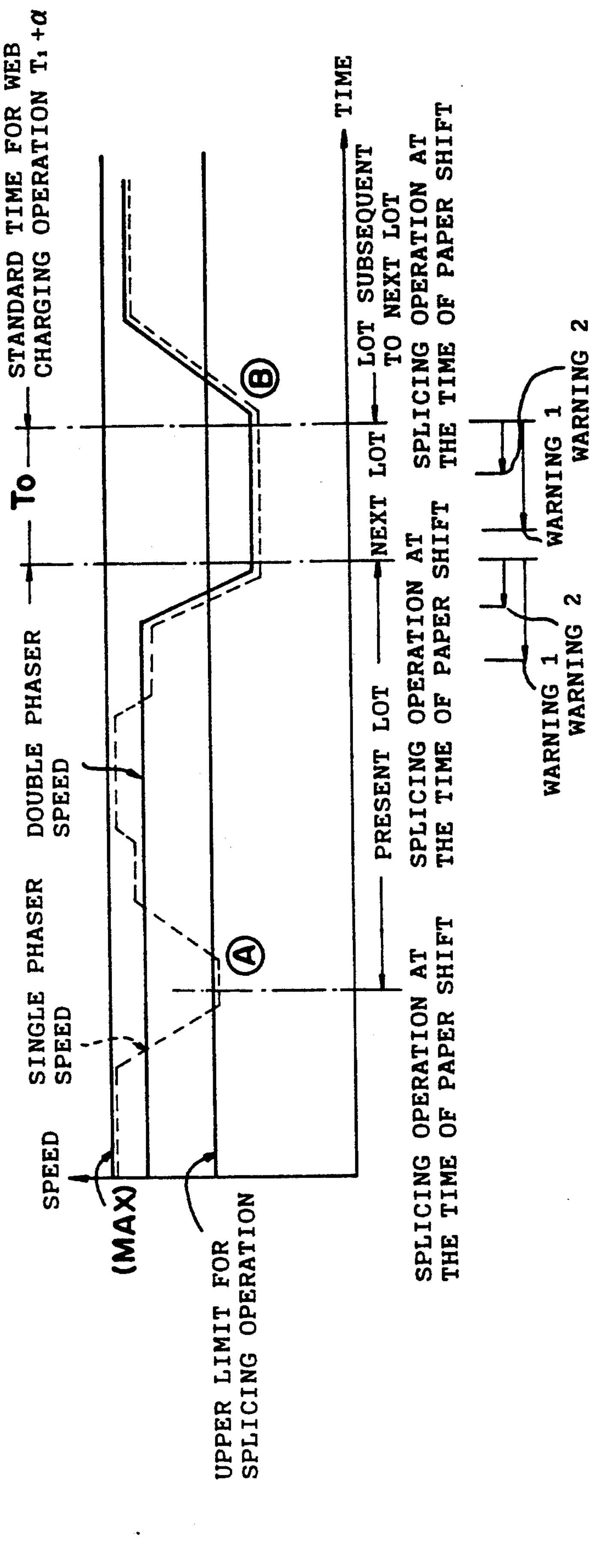
FIG. 2 is a diagram which shows a relationship between a web running speed and a time in this system, particularly illustrating a manner of controlling a production speed of the apparatus for producing corrugated paper boards.

In a case where a paper shifting operation is started with the switch 81 shifted to ON by an operator when it is found from the result derived from the foregoing comparison that the paper shift remaining time $T_s$ is longer than the operation setting time $T_0$, there is existent some time allowance. For this reason, there is no need of decelerating the running speed of each web. When a paper shifting operation is performed for the front liner paper 10, the running speed of each web in the double facer is controlled in the same manner as mentioned above. On the contrary, in a case where a production length associated with a next production lot, i.e., the paper shift remaining time $T_s$ is shorter than the operation setting time $T_0$, a running speed in the single facer and the double facer is reduced and a deceleration signal is then outputted so as to assure the paper shift remaining length time $T_s$ and the operation setting time $T_0$ required for a paper shifting operation like in a location B in FIG. 2. Once the running speed in the single facet and the double facer is reduced in the above-described manner, the speed calculated in the speed detecting unit 73 based on an output from the rotary pulse signal generator PG is reduced correspondingly. This makes it possible to assure a time longer than the operation setting time $T_0$ in association with the paper shift remaining time $T_s$ calculated in the calculating unit 72. In this case, not only the speed of the double facer 16 but also the speed of the gluing machine 33 are controlled for performing a paper shifting operation for the front liner paper 10.

In addition, when the operation setting time $T_0$required for performing a paper shifting operation is reached during a controlling operation, the subtraction counter 79 receives timer clock pulses from the splicers and other associated controlling units and a subtractive operation is then started from the preset operation setting time $T_0$. When it is found from the result derived from a comparison between the values derived from successive subtractive calculations and the paper shift remaining time $T_s$ in the comparator 80 that the paper shift remaining time $T_s$ is shorter than the operation setting time $T_0$, a deceleration signal is outputted from the comparator 80 corresponding to the difference derived from the foregoing comparison.

As will be apparent from the above description, with the system for informing a paper shift during a production controlling operation for an apparatus for producing corrugated paper boards in accordance with the present invention, not only in a case where a small production lot has a length shorter than the paper shifting operation time but also in a case where an operator starts preparation for a production controlling operation with much delay, a remaining time enough long to perform a paper shifting operation can be assured. In addition, a warning can be informed at respective steps including the start time of a production controlling operation, the intermediate time of the same or the like during production of the corrugated paper boards. Thus, it can be concluded that the system of the present invention can be utilized very conveniently.

While the present invention has been described above with respect to a single preferred embodiment, it should of course be understood that the present invention should not be limited only to this embodiment but various changes or modifications may be made without departure from the Scope of the invention as defined by the appended claims.

What is claimed is:

1. A system for controlling a paper shift in a corrugated paper board production apparatus comprising:
   - remaining production length determining means for providing a remaining production length signal indicative of a remaining production length from a slicer to a splice point;
   - running speed determining means for providing a running speed signal indicative of a running speed of each web in said apparatus;

paper shift remaining time calculating means for receiving said remaining production length signal and said running speed signal and for providing a remaining time signal indicative of a time remaining until a paper shift is required responsive to said remaining production length signal and said running speed signal;

data storage means for storing data indicative of at least one time required for preparation of a paper shift and for providing a prior time data output indicative of said data; and prior time informing means for receiving said prior time data output and for generating said informing signal when said remaining time signal is equal to a predetermined value;

prior time determination means for receiving said remaining time signal and for outputting an informing signal when said remaining time signal reaches a predetermined value, said prior time determination means including data storage means for storing data indicative of at least one time required for preparation of a paper shift and for providing a prior time data output indicative of said data, and prior time informing means for receiving said prior time data output and for generating said informing signal when said remaining time signal is equal to said predetermined value; and deceleration commanding means for outputting a deceleration command signal to decelerate a running speed of each web responsive to said informing signal.

2. The system of claim 1, wherein said remaining production length determining means comprises:

core remaining length counter means for determining length of a core sheet remaining before a cutting operation; and liner remaining length counter means for determining length of a liner sheet remaining before a cutting operation.

3. The system of claim 1, wherein said remaining production length determining means comprises at least one rotary pulse signal generator, each of said at least one rotary pulse signal generators being disposed to measure a running sheet length.

4. The system of claim 1 further comprising paper shift remaining time indicating means for displaying information indicative of an amount of time remaining before a paper shift operation.

5. The system of claim 4 wherein said paper shift remaining time indicating means comprises means for displaying information on kinds of paper usable on a web.

6. The system of claim 1 wherein said data storage means comprises:

first warning time storage means for storing a first warning time equal to the sum of a standard time required for a paper shifting operation and an allowance time; and, second warning time storage means for storage a second warning time shorter than said first warning time.

7. The system of claim 6 wherein said data storage means further comprises third warning time storage means for storing a warning time shorter than said second warning time.

8. The system of claim 1 further comprising sound generating means responsive to said informing signal for generating a sound to inform an operator of an incoming paper shift operation.

9. The system of claim 8 wherein said sound generating means comprises means for generating a sound having a tone varying in accordance with said at least one time.

10. The system of claim 1 further comprising warning lamp means responsive to said informing signal for generating light indicative of an upcoming paper shift operation.

11. The system of claim 10 further comprising means for generating light having a color varying in accordance with said at least one time.

12. The system of claim 1 wherein said deceleration commanding means comprises:

input unit means for providing a signal indicative of a standard time required for a paper shifting operation;

subtraction counter means for subtracting a preset preceding splicing operation time from said standard time signal to obtain a subtraction result;

comparator means for comparing said subtraction result to said remaining time signal and for providing a deceleration signal when said remaining time signal is less than said subtraction result; and deceleration means for decelerating a roll responsive to said deceleration signal.

13. The system of claim 12 further comprising clock timer means for providing a timing pulse to said subtraction counter means, said subtraction counter means being responsive to said timing pulse.

14. The system of claim 12 further comprising:

a confirmation switch; and gate means responsive to said configuration switch for receiving said deceleration signal and for providing said deceleration signal to said deceleration means when said switch is activated by an operator.

* * * * *